(12) United States Patent
Clodic et al.

(10) Patent No.: US 11,243,026 B2
(45) Date of Patent: Feb. 8, 2022

(54) METHOD AND DEVICE FOR LIQUEFACTION OF METHANE

(71) Applicant: CRYO PUR, Palaiseau (FR)

(72) Inventors: Denis Clodic, Palaiseau (FR); Joseph Toubassy, Palaiseau (FR)

(73) Assignee: CRYO PUR, Palaiseau (FR)

(*) Notice: Subject to any disclaimer, the term of this patent is extended or adjusted under 35 U.S.C. 154(b) by 656 days.

(21) Appl. No.: 15/307,919

(22) PCT Filed: May 5, 2015

(86) PCT No.: PCT/FR2015/051191
§ 371 (c)(1),
(2) Date: Oct. 31, 2016

(87) PCT Pub. No.: WO2015/173491
PCT Pub. Date: Nov. 19, 2015

(65) Prior Publication Data
US 2017/0051969 A1 Feb. 23, 2017

(30) Foreign Application Priority Data
May 14, 2014 (FR) .................................. 14 54275

(51) Int. Cl.
F25J 1/02 (2006.01)
F25J 1/00 (2006.01)
F17C 5/02 (2006.01)

(52) U.S. Cl.
CPC ............. F25J 1/0275 (2013.01); F17C 5/02 (2013.01); F25J 1/004 (2013.01); F25J 1/0022 (2013.01);
(Continued)

(58) Field of Classification Search
CPC ........ F25J 1/0022; F25J 1/0254; F25J 1/0025; F25J 1/0275; F25J 2215/60;
(Continued)

(56) References Cited

U.S. PATENT DOCUMENTS 2,896,414 A * 7/1959 Tung ..................... F25J 1/004
62/613
3,194,025 A * 7/1965 Grossmann ............ F25J 1/005
62/614
(Continued)

FOREIGN PATENT DOCUMENTS

AU 2006241566 A1 11/2006
GB 822122 A * 10/1959 ............. F25J 1/0022
WO 2010/128467 A2 11/2010

OTHER PUBLICATIONS

International Search Report for PCT/FR2015/051191 dated Nov. 10, 2015 [PCT/ISA/210].
Written Opinion for PCT/FR2015/051191 dated Nov. 10, 2015 [PCT/ISA/237].
Flüeggen et al., "Pressurised LNG—and the Utilisation of Small Gas Fields", LNG/LPG Conference, Nov. 7, 1978, XP-001055302, pp. 195-204.
International Search Report for PCT/FR2015/051191 dated Nov. 10, 2015.
Written Opinion for PCT/FR2015/051191 dated Nov. 10, 2015.

Primary Examiner — John F Pettitt, III
(74) Attorney, Agent, or Firm — Sughrue Mion, PLLC

(57) ABSTRACT

Method of liquefaction of methane and filling a tank (2) with liquefied methane,
said method comprising:
  a step of liquefaction of the methane comprising an operation of cooling the methane to its saturation temperature,
  a step of filling the tank with the liquefied methane,
(Continued)

a step of reinjection of the vaporized methane into the liquefaction system.

6 Claims, 3 Drawing Sheets

(52) U.S. Cl.
CPC ............ *F25J 1/0052* (2013.01); *F25J 1/0212* (2013.01); *F25J 1/0219* (2013.01); *F25J 1/0254* (2013.01); *F17C 2221/033* (2013.01); *F17C 2223/033* (2013.01); *F17C 2227/0337* (2013.01); *F17C 2227/04* (2013.01); *F17C 2250/01* (2013.01); *F17C 2250/032* (2013.01); *F17C 2260/031* (2013.01); *F17C 2270/01* (2013.01); *F25J 2215/60* (2013.01); *F25J 2230/30* (2013.01); *F25J 2230/60* (2013.01); *F25J 2245/90* (2013.01); *F25J 2270/90* (2013.01); *F25J 2290/12* (2013.01); *F25J 2290/62* (2013.01)

(58) Field of Classification Search
CPC .... F25J 2290/60; F25J 2223/035; F17C 5/02; F17C 6/00; F17C 2227/042; F17C 2250/01; F17C 2250/0626
See application file for complete search history.

(56) References Cited

U.S. PATENT DOCUMENTS

| | | | | |
|---|---|---|---|---|
| 3,828,564 A | * | 8/1974 | Spies | F25J 1/0052 62/608 |
| 4,727,723 A | * | 3/1988 | Durr | F25J 1/0022 62/48.2 |
| 4,843,829 A | * | 7/1989 | Stuber | F25J 1/0025 62/54.2 |
| 5,036,671 A | | 8/1991 | Nelson et al. | |
| 2005/0247078 A1 | * | 11/2005 | Wilkinson | F25J 1/0022 62/612 |
| 2012/0036888 A1 | | 2/2012 | Vandor | |
| 2012/0060553 A1 | | 3/2012 | Bauer | |
| 2013/0180282 A1 | * | 7/2013 | Palmer | F25J 1/0254 62/611 |
| 2013/0192297 A1 | | 8/2013 | Mak | |

* cited by examiner

METHOD AND DEVICE FOR LIQUEFACTION OF METHANE

CROSS REFERENCE TO RELATED APPLICATIONS

This application is a National Stage of International Application No. PCT/FR2015/051191 filed May 5, 2015, claiming priority based on French Patent Application No. 14 54275 filed May 14, 2014, the contents of all of which are incorporated herein by reference in their entirety.

The invention relates to the domain of liquefaction of methane and the filling of a transport tank therewith.

Natural gas and biomethane essentially contain methane. The first is produced from the extractive industry while the other comes from the fermentation of waste.

For both, the gaseous methane is liquefied in order to improve the energy density of the methane flow for purpose of its transport. The liquefaction of fossil natural gas is performed in cryopreservation units where the temperature of the methane is lowered to a value of less than −161° C. at atmospheric pressure. The methane thus liquefied can be transported over long distances by ship at a realistic cost.

Thermal losses make it impossible to permanently maintain the methane in liquid state under its initial pressure. Thus, a portion of the methane is vaporized and the pressure in the tank where the methane is stored increases as a result. It is therefore necessary to manage the increase in pressure in the tank. The solution therefore consists of extracting the evaporated methane from the tank. The extracted methane can be burned, liquefied again or used as fuel to supply various turbines. This issue is covered in a great deal of literature.

American patent application no. 2013/0192297 (JOHN MAK) presents a liquefaction unit. The gas flow arrives at a pressure of 31 bar; it is decontaminated, then passed through a heat exchanger and stored in a tank at a temperature of −141° C. at a pressure of about 4.1 bar. In the tank, the fraction of gas that is evaporated is pre-cooled before being added to the incoming gas flow. The liquefied gas in the tank is then injected into transport trucks at a pressure of 4.1 bar.

Australian patent application no. 2006241566 (SINGLE BUOY MOORINGS) describes a liquefied gas filling device in a transport ship commonly called LNG vessel. From an onshore station, the liquefied gas is taken to the LNG vessel at a pressure in the pipelines of 1 bar. This document particularly concerns the fraction of methane that is evaporated in the pipelines because of the length of said pipelines, load losses and thermal losses. In particular, this document describes a device for returning the methane being vaporized in the pipelines to the onshore unit.

These documents are not concerned in any way with the energy consumption of these devices. Filling at these pressures requires that the methane be kept at a low temperature in the tanks.

The filling pressures commonly used in the industry involve cooling the gas to very low temperatures. For example, at atmospheric pressure, the methane is stored at a temperature of less than −161° C., and at 4.1 bar, it is maintained at a temperature of less than −141° C. However, the cooling systems that supply the heat exchangers are extremely energy-intensive. One means for dealing with the excessive energy consumption would be to liquefy the gas at a temperature higher than the ones mentioned above.

The objective is to propose a solution for liquefying the methane and transporting it while optimizing the energy consumption of the facility.

To that end, a method is first proposed for liquefaction of methane and filling a transport tank with the liquefied methane. Said method is implemented by means of a liquefaction device comprising:
  a system for liquefaction of the initially gaseous methane,
  a system for filling the transport tank with the liquefied methane.

Said method comprises:
  a step of liquefaction of the methane comprising an operation of cooling the methane to its saturation temperature,
  a step of filling the transport tank with the liquefied methane.

During the filling step, the fraction of gaseous methane in the transport tank is returned to the liquefaction system.

Method wherein:
  the liquefaction step is performed when the methane is at a pressure substantially equal to 15 bar,
  in the filling step, the methane is introduced into the transport tank at the transport pressure, said pressure being less than or substantially equal to 8 bar.

Various additional characteristics can be foreseen, alone or in combination
  the liquefaction step comprises an operation of compression of the methane at a pressure substantially equal to 15 bar;
  relief of the pressure in the transport tank is done with reinjection of the gaseous fraction of methane into the liquefaction system;
  the gaseous methane arrives in the liquefaction system at an initial temperature of about −100° C.;
  the gaseous methane is compressed at a pressure substantially equal to 15 bar by means of a compressor, the methane leaving the compressor being at a temperature substantially equal to 80° C.;
  the gaseous methane is cooled a first time to a temperature substantially equal to 20° C. in the liquefaction system, then the gaseous methane is cooled a second time to a temperature of −90° C. in the liquefaction system;
  the methane is cooled a third time to a temperature substantially equal to −114° C. in the liquefaction system, said temperature corresponding to a saturation pressure of about 15 bar.

Secondly, proposed is a device for liquefaction of methane and filling of a tank comprising:
  a system for liquefaction of the initially gaseous methane,
  a system for filling the transport tank with the liquefied methane,
  a buffer tank supplied with liquefied methane by the liquefaction system.

The liquefaction system comprises at least one heat exchanger for liquefying the gaseous methane and means for relieving the pressure between the buffer tank and the transport tank. The liquefaction system comprises a compressor arranged to compress the gaseous methane to a pressure substantially equal to 15 bar.

Various additional characteristics can be foreseen, alone or in combination:
  said device comprises a system for reinjection of the gaseous fraction of methane, said reinjection system further comprising:
    means for measuring the pressure in the buffer tank and in the transport tank, said means being in the form of a pressure gauge or pressure sensor, and the liquefaction system comprises a first heat exchanger and a second heat exchanger, the second heat exchanger enabling the gaseous methane to be cooled to a temperature substantially equal to 20° C. and the first heat exchanger enabling the gaseous methane coming from the second heat exchanger to be cooled to a temperature substantially equal to −90° C.

the device comprises a computerized unit programmed to execute the steps of the method described above.

Other objects and advantages of the invention will be seen from the following description of an embodiment, provided with reference to the appended drawings in which.

Figure 1:
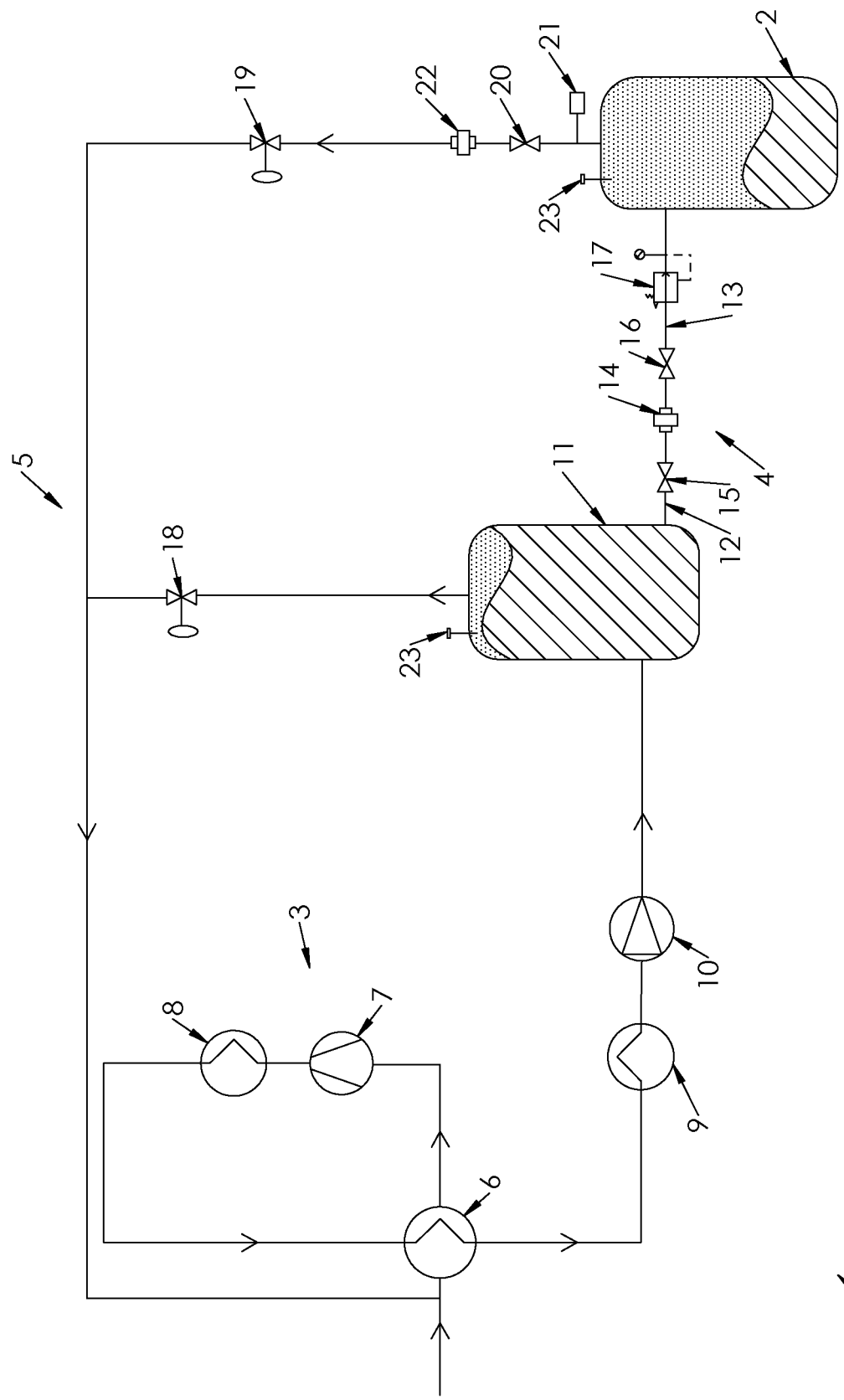
FIG. 1 is a schematic representation of a methane liquefaction and filling device.

Schematically represented in FIG. 1 is a device 1 for liquefaction of methane and filling a transport tank 2. Said transport tank 2 can be in different forms, such as a tank truck, mobile silos or a liquid natural gas ship.

In one embodiment represented in FIG. 1, the device 1 comprises:
- a system 3 for liquefaction of the initially gaseous methane,
- a system 4 for filling the transport tank 2 with the liquefied methane,
- a system 5 for reinjection of a gaseous fraction of the methane into the liquefaction system 3.

The liquefaction system 3 comprises, in the order of passage of the gas (represented in FIG. 1 by arrows), a first heat exchanger 6, a compressor 7, a second heat exchanger 8, a liquefaction exchanger 9 and a pump 10. The liquefaction system 3 also comprises a buffer tank 11. The buffer tank 11 is intended to store the liquefied methane and to maintain a flow in the device 1 when the transport tank 2 is filled.

The filling system 4 takes the liquefied methane from the buffer tank 11 to the transport tank 2.

The filling system 4 comprises a first part 12 and a second part 13 connected to each other by an injection connection 14. The first and second parts 12, 13 respectively comprise a first shutoff valve 15 and a second shutoff valve 16. Said shutoff valves 15, 16 make it possible, when the injection connection 14 is unlocked, to interrupt the flow of methane coming from the buffer tank 11 and from the transport tank 2. The second part 13 further comprises a pressure regulator 17 enabling the pressure of the liquefied methane leaving the buffer tank 11 to be lowered.

The reinjection system 5 connects the buffer tank 11 and the transport tank 2 at the intake of the liquefaction system 3. Thus, the fraction of methane being vaporized in the buffer tank 11 and in the transport tank 2 is recovered and routed to the liquefaction system 3 in order to be processed again. The buffer tank 11 comprises a pressure gauge or pressure sensor (not shown). Said pressure gauge is connected to a computerized unit (not shown). Thus, when the pressure in the buffer tank 11 is too high for one reason or another, the computerized unit controls the relief of the pressure in the buffer tank 11.

The reinjection system 5 connects the buffer tank 11 and the transport tank 2 at the liquefaction system 3. The reinjection system 5 comprises a pressure regulator 18 situated downstream from the buffer tank 11 as well as a reinjection solenoid valve 19, a valve 20 and a pressure gauge 21 (or pressure sensor) situated downstream from the transport tank 2. The reinjection solenoid valve 19 is manipulated by an actuator (not shown), which is also controlled by a computerized unit (not shown). A reinjection connection 22 makes it possible to separate the transport tank 2 from the reinjection system 5. The valves 19, 20 are arranged in such a way as to block any flow of methane out of the transport tank 2 and out of the reinjection system 5 when the reinjection connection 22 is unlocked. The buffer tank 11 is continuously fed by the liquefaction system 3; the pressure there varies, slightly increasing because of the heat gain through the insulation of the buffer tank 11. The pressure regulator 18 enables the pressure in the buffer tank 11 to be regulated. Said regulation is achieved by releasing the fraction of methane that is vaporized due to heat losses in the buffer tank 11, said gaseous methane being returned to the liquefaction system 3.

The liquefaction method will be described in the following, step by step. Said method comprises:
- a step of liquefaction of the methane with compression thereof and filling of the buffer tank 11,
- a step of relieving the pressure of the methane leaving the buffer tank 11 to the transport tank 2.

During the liquefaction step, the gaseous methane arrives in the device 1 at a temperature close to −100° C. and enters the first heat exchanger 6 where it is reheated to a temperature of about 20° C. The gaseous methane then enters a compressor 7 in order to be compressed to a pressure of 15 bar. The compressor 7 has a discharge temperature of about 80° C. because it is cooled. The methane leaving the compressor 7 is therefore at a pressure of 15 bar and a temperature of 80° C. The methane is cooled to a temperature of 20° C. in a second heat exchanger 8. The methane then passes again through the first heat exchanger 6 where its temperature is lowered to −90° C. At this stage, the methane is still in a gaseous state. It is liquefied in the liquefaction exchanger 9, where it is cooled to a saturation temperature of close to −114° C., corresponding to the saturation pressure of 15 bar. The liquefied methane is then stored in the buffer tank 11 at a pressure of 15 bar and a temperature of −114° C.

The transport tank 2 is then filled with liquefied methane from the buffer tank 11 at a transport pressure. Typically, the transport pressure is between 1 and 8 bar, while the pressure in the buffer tank 11 is about 15 bar. The liquefied methane is routed from the buffer tank 11 to the transport tank 2 by means of the filling system 4. In the filling system 4, the pressure of the liquefied methane (15 bar) is lowered to the transport pressure (between 1 and 8 bar) by means of the pressure regulator 17. Thus, the transport tank 2 is filled with liquefied methane at the transport pressure.

Figure 2:
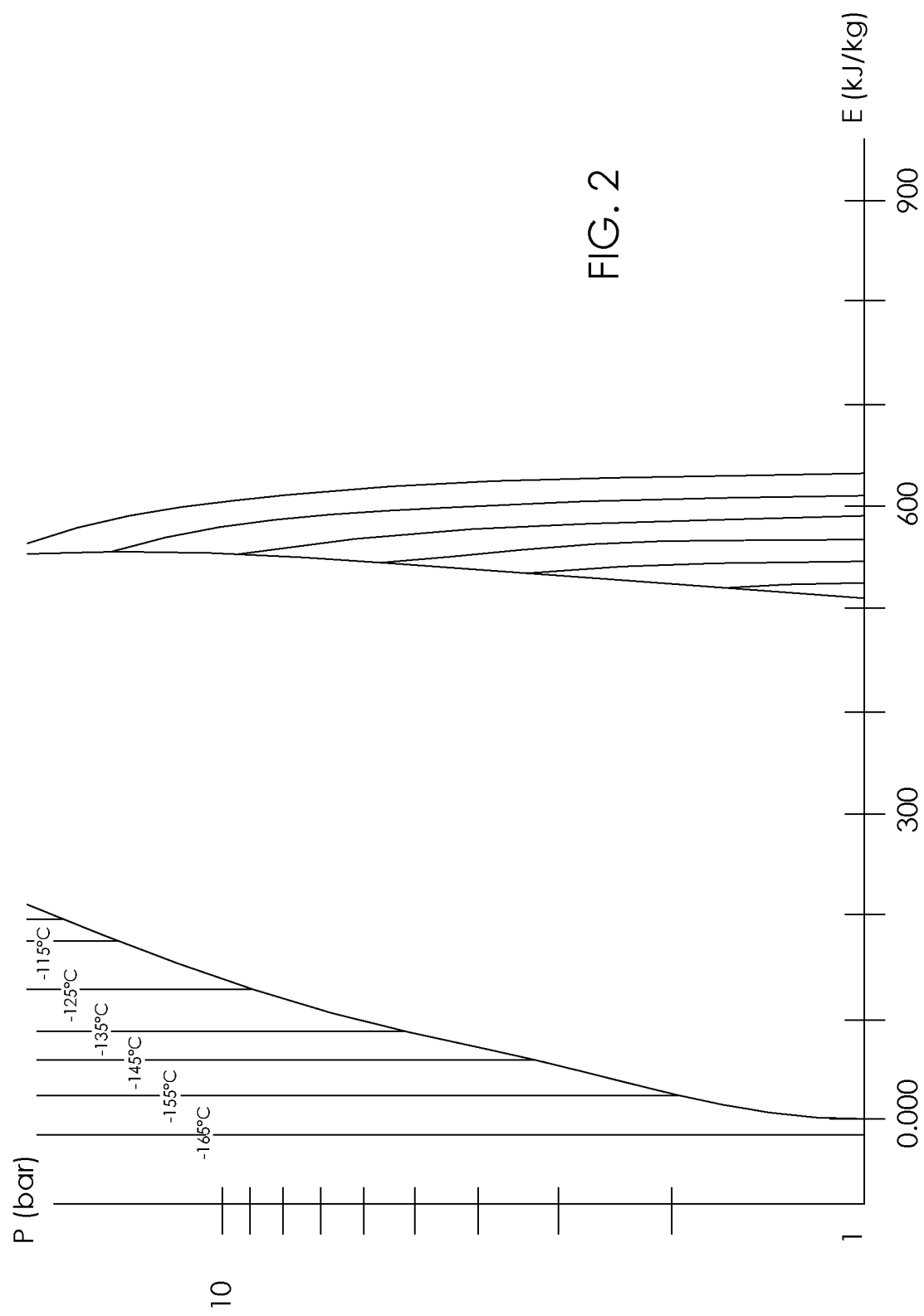
FIG. 2 is a pressure—enthalpy diagram, the pressure being represented in logarithmic scale.

The saturation pressure and temperature relationship is presented by the pressure—enthalpy diagram illustrated in FIG. 2. At a pressure of 15 bar, the saturation temperature of the methane approaches −114° C.

It should be noted that the coolant fluids are not identical in each of the heat exchangers. The first heat exchanger 6 is cooled by the flow of gaseous methane entering the device 1. The methane initially being at a temperature near −100° C., this temperature is used to cool the methane coming from the second heat exchanger 8. The second heat exchanger 8 uses water as the coolant fluid. The liquefaction exchanger 9 uses a hydrocarbon mixture as coolant. These fluids are particularly efficient in the cryopreservation industry because of their phase change temperatures.

In the buffer tank 11, a fraction of methane is vaporized continuously because of heat losses. Said gaseous fraction is returned to the liquefaction system 3 by means of the reinjection system 5, thus maintaining a flow of gas in the device 1.

Simultaneously, the transport tank 2 is filled from the buffer tank 11 at the transport pressure of less than 8 bar. As the transport tank is filled, the valve 19 regulates the pressure in the transport tank 2 in order to maintain the desired pressure. This makes it possible not to impede the passage of the methane entering the transport tank 2 while ensuring the safety of the facility. The transport tank 2 and the buffer tank 11 comprise a safety valve 23 that is triggered when the internal pressure of the tanks reaches a predetermined threshold that is deemed critical for the facility. The valves 23 are connected to a gas flare (not shown).

When the transport tank 2 is filled, the injection valves 15, 16 are closed and the valves 19, 20 continue to regulate for a period of time, if necessary, the pressure in the transport tank 2. When said pressure reaches the desired transport pressure (as indicated by the pressure gauge 21), the valves 19, 20 are closed in turn and their connections 14, 22 are unlocked. The transport tank 2 can then be replaced by an empty tank.

The fact that the methane can be liquefied at higher pressures than those of the transport pressure enables substantial energy savings. The saturation temperature of the methane at a pressure of 15 bar is higher than the saturation temperature at a pressure of 4 bar, for example. Thus, to maintain the methane in liquid state, less energy is necessary because the liquefaction temperature is higher. Indeed, it seems that increasing the pressure in the liquefaction system 3 is less energy-intensive than lowering the temperature in said system.

Said finding is validated by a series of calculations that we present below. The thermodynamic data of the methane that are furnished in the calculations are data from the Refprop 9® Software developed and marketed by the National Institute of Standards and Technology (NIST).

During liquefaction, the compression of the gaseous methane and its cooling to a cryopreservation temperature are the most energy-consuming operations.

We are therefore going to compare liquefaction of methane at 15 bar and methane compressed at 4 bar.

Figure 3A:
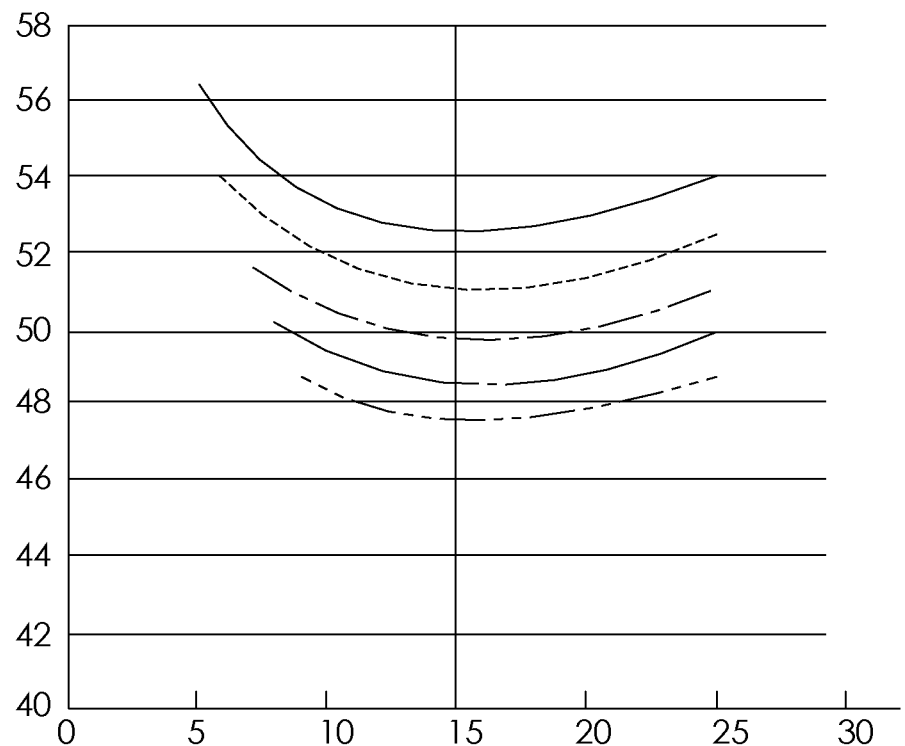
FIG. 3a represents the variation in electric power needed in kW for 100 normal cubic meters of methane per hour at an initial temperature of about −100° C. based on a given transport pressure and liquefaction pressure. Each curve corresponds to a transport pressure while the ordinate and abscissa correspond respectively to the electric power and liquefaction pressure.
Figure 3B:
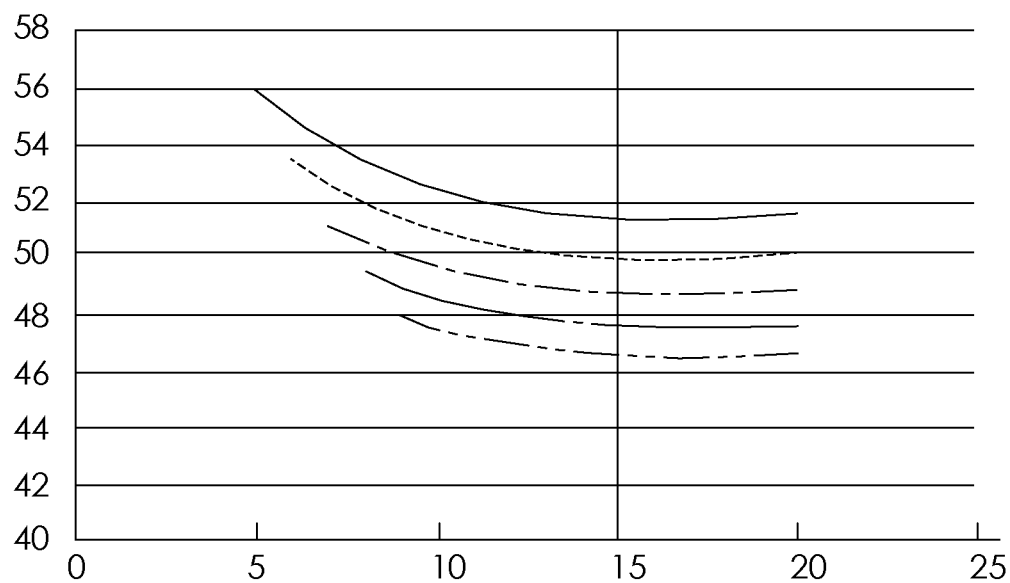
FIG. 3b is similar to FIG. 3a, with the difference that the methane is initially at ambient temperature.

The value of 15 bar is not arbitrarily chosen. Said value is the result of calculations made by the applicant. The curves in FIGS. 3*a* and 3*b* represent the variation of electric power necessary for 100 normal cubic meters of methane per hour, depending on the transport and liquefaction pressures. FIG. 3*a* presents this variation of power for methane at a temperature of −100° C., while FIG. 3*b* applies to methane at ambient temperature. A study has been carried out on methane at −100° C. because when leaving the methane decontamination units and before entering the liquefaction units, it is substantially at that temperature. The electric power represented in FIGS. 3*a* and 3*b* is for a unit of mass of methane to be liquefied:

the electric power for the compression of the methane initially at 1 bar to a liquefaction pressure for a compressor 7 efficiency of 0.8, the electric power necessary for liquefaction by taking a coefficient of performance (COP) of the cooling system of 30% to 40% compared to the Carnot ideal COP, the electric power necessary for re-liquefaction of the evaporated fraction of methane at the time said methane is pressure-relieved to reach the transport pressure of less than 8 bar.

In FIGS. 3*a* and 3*b*:

the solid line corresponds to a transport pressure of 4 bar,
the dotted line corresponds to a transport pressure of 5 bar,
the chain-dotted line corresponds to a transport pressure of 6 bar,
the long chain-dotted line corresponds to a transport pressure of 7 bar,
the chain-dotted and dashed line corresponds to a transport pressure of 8 bar.

As can be seen in FIGS. 3*a* and 3*b*, an optimum can be seen at the 15-bar abscissa. The power consumed is therefore minimal at a liquefaction pressure of about 15 bar. This is true, irrespective of the transport pressure for an initial temperature of the methane of −100° C. or at ambient temperature.

Methane compressed at 4 bar is liquefied at a temperature of 131 K. To liquefy the methane, the cooling system uses a cooling fluid at a temperature obviously less than the liquefaction temperature of the methane. Take, for example, a cooling fluid at a temperature of 126 K. We consider the condensation temperature of the system at 20° C. or 293 K, while taking into consideration normal climatic conditions of 15° C. In the calculations that follow, the values are rounded off.

We calculate the coefficient of performance (COP):

$$COP = \frac{126}{293 - 126} = 0.75$$

Liquefaction is done ideally with a cooling system having a COP equal to 0.75. By taking a COP of the cooling system of 30% compared to the ideal COP, we calculate a COP of 0.23.

In the device described, the methane initially being at −90° C. or 163 K should go below −142° C. or 131 K. The energy needed is therefore 100 kJ/kg$_{methane}$ (FIG. 2). The change-of-state enthalpy of the methane at a pressure of 4 bar, which is equal to 468.4 kJ/kg$_{methane}$ (FIG. 2), should be added to this value. Liquefaction can therefore be achieved with a total enthalpy of 568.4 kJ/kg$_{methane}$.

The electricity consumption is given by dividing the enthalpy by the COP, i.e.:

$$\frac{568.4}{0.23} = 2{,}511 \text{ kJ}_{electricity}/\text{kg}_{methane}$$

The compression of 1 to 4 bar requires energy of 183 kJ$_{electricity}$/kg$_{methane}$. Thus, there is a total electricity consumption of 2,694 kJ$_{electricity}$/kg$_{methane}$.

Let us now take the example of liquefaction at a pressure of 15 bar.

The liquefaction temperature of the methane at 15 bar is −114° C. or 159 K. Under the same climatic conditions as before, the COP is given by the following relationship:

$$\frac{154}{293 - 154} = 1.11$$

This gives us an actual COP of 0.33. The cooling from −90° C. or 183 K to −114° C. or 159 K requires energy of 52 kJ/kg$_{methane}$. The change-of-state enthalpy equals 378.8 kJ/kg$_{methane}$, which makes a total of 430.8 kJ/kg$_{methane}$ cooling energy needed. The electricity consumption needed is:

$$\frac{430.8}{0.33} = 1{,}296 \text{ kJ}_{electricity}/\text{kg}_{methane}$$

The compression from 1 to 15 bar requires electric energy of 526.5 kJ/kg$_{methane}$. Therefore, total energy of 1,822.5 kJ$_{electricity}$/kg$_{methane}$ is needed.

Said liquefaction method therefore enables a savings of electric energy of nearly 48%. At an industrial scale, said method therefore makes it possible to lighten the energy bill considerably, reducing it by nearly half.

Said method can also be applied to gas from natural deposits. In such a case, it is foreseeable to benefit from the pressure of the deposit in order to eliminate the compression step. Liquefaction can therefore be performed at a pressure of 15 bar without first compressing the methane.

Advantageously, the pressure of the methane coming from the buffer tank 11 is relieved as close as possible to the transport tank 2. This arrangement is applicable in a case in which the transport tank 2 is an LNG vessel. Indeed, in port installations, the cryopreservation units are frequently at some distance from the filling terminals of the LNG vessels. Thus, the liquid methane travels sometimes several kilometers in pipelines before being stored in the LNG vessel. Pipelines are generally underwater or underground and are not refrigerated. Consequently, part of the transported methane is vaporized. The idea is therefore to transport the methane at a pressure of about 15 bar and to relieve the pressure just before it enters the LNG vessel. Thus, the temperature difference between the methane and the exterior environment is not as high as if the methane were transported at lower pressures.

However, another solution can be considered. This involves carrying out a pressure-relief stage. Indeed, for various reasons, transporting methane at a pressure of 15 bar may not be possible. Consequently, a first pressure relief can advantageously be effected at the output of the buffer tank 11. The pressure of the methane is then less than 15 bar but higher than the transport pressure. Thus, the methane is transported to the LNG vessel, where the pressure is again relieved before the methane goes on board. This makes it possible to prevent too large a fraction of methane from vaporizing in the pipelines. Overall, the performance is improved since less methane is vaporized and then returned to the cryopreservation unit to be liquefied again. The unit will therefore consume less energy.

The invention claimed is:

1. A method of liquefaction of methane and filling a transport tank with liquefied methane, comprising:
    a step of providing gaseous methane to a liquefaction system,
    a step of cooling the gaseous methane to its saturation temperature in the liquefaction system so as obtain the liquefied methane,
    a step of filling the transport tank with the liquefied methane, during which, in the transport tank, a fraction of the liquefied methane transitions to a second gaseous methane and the fraction of the liquefied methane that has transitioned to the second gaseous methane in the transport tank is returned to the liquefaction system,
    wherein:
    in the step of providing the gaseous methane to the liquefaction system, the gaseous methane arrives in the liquefaction system at a temperature of −100° C.,
    the step of cooling the gaseous methane to its saturation temperature is performed at a pressure of 15 bar,
    in the filling step of the transport tank, the liquefied methane is introduced into the transport tank at a transport pressure, said transport pressure being less than or of 8 bar,
    and wherein
    the step of filling the transport tank with the liquefied methane is done from a buffer tank, and
    the liquefaction methane is stored in the buffer tank at a pressure of 15 bar and a temperature of −114° C.

2. The method according to claim 1, wherein the step of cooling the gaseous methane to its saturation temperature in the liquefaction system so as obtain the liquefied methane comprises an operation of compression of the gaseous methane.

3. The method according to claim 1, wherein pressure in the transport tank is reduced with the fraction of the liquefied methane that has transitioned to gaseous methane in the transport tank being removed and returned to the liquefaction system.

4. The method according to claim 1, wherein the gaseous methane is compressed at the pressure of 15 bar by a compressor in order to carry out the step of cooling the gaseous methane to its saturation temperature performed at the pressure of 15 bar, and wherein the compressor has a discharge temperature substantially equal to 80° C.

5. The method according to claim 1, wherein the gaseous methane is cooled a first time to a temperature substantially equal to 20° C. in the liquefaction system, then the gaseous methane is cooled a second time to a temperature of −90° C. in the liquefaction system.

6. The method according to claim 5, wherein the gaseous methane is cooled a third time to a temperature of −114° C. in the liquefaction system.

* * * * *